(12) United States Patent
Ghabra

(10) Patent No.: US 9,007,195 B2
(45) Date of Patent: Apr. 14, 2015

(54) REMOTE FOB INTEGRATED IN A PERSONAL CONVENIENCE DEVICE

(75) Inventor: Riad Ghabra, Dearborn Heights, MI (US)

(73) Assignee: Lear Corporation, Southfield, MI (US)

(*) Notice: Subject to any disclaimer, the term of this patent is extended or adjusted under 35 U.S.C. 154(b) by 316 days.

(21) Appl. No.: 12/987,477

(22) Filed: Jan. 10, 2011

(65) Prior Publication Data

US 2011/0102164 A1    May 5, 2011

Related U.S. Application Data

(63) Continuation-in-part of application No. 10/876,698, filed on Jun. 25, 2004, now Pat. No. 7,868,745.

(51) Int. Cl.
*B60R 25/10* (2013.01)
*B60R 25/24* (2013.01)
*B60R 25/04* (2013.01)

(52) U.S. Cl.
CPC ............... *B60R 25/246* (2013.01); *B60R 25/04* (2013.01)

(58) Field of Classification Search
USPC .......... 340/426.16, 5.2, 5.61, 426.36, 426.13, 340/12.22, 426.3, 686.1, 686.6, 539.1, 340/539.22
See application file for complete search history.

(56) References Cited

U.S. PATENT DOCUMENTS

| | | | |
|---|---|---|---|
| 4,868,915 A | 9/1989 | Anderson, III et al. | |
| 5,864,297 A * | 1/1999 | Sollestre et al. | 340/5.23 |
| 6,034,617 A * | 3/2000 | Luebke et al. | 340/5.62 |
| 6,236,333 B1 | 5/2001 | King | |
| 6,308,083 B2 | 10/2001 | King | |
| 6,320,514 B1 | 11/2001 | Flick | |
| 6,359,348 B1 | 3/2002 | King | |
| 6,377,173 B1 | 4/2002 | Desai | |
| 6,396,412 B1 | 5/2002 | Banas | |
| 6,420,967 B1 | 7/2002 | Ghabra et al. | |
| 6,525,645 B2 | 2/2003 | King et al. | |
| 6,525,646 B1 | 2/2003 | Bartz | |
| 6,535,107 B1 | 3/2003 | Bartz | |
| 6,563,474 B2 | 5/2003 | Nantz et al. | |
| 6,617,961 B1 * | 9/2003 | Janssen et al. | 340/5.8 |
| 6,617,975 B1 * | 9/2003 | Burgess | 340/815.47 |

(Continued)

FOREIGN PATENT DOCUMENTS

| | | |
|---|---|---|
| DE | 4003280 A1 | 8/1991 |
| DE | 19852223 A1 | 5/2000 |

(Continued)

OTHER PUBLICATIONS

German Office Action to DE 10 2005 028 677.1-51 dated Feb. 15, 2011.

(Continued)

*Primary Examiner* — Daniel Previl
(74) *Attorney, Agent, or Firm* — MacMillan, Sobanski & Todd, LLC

(57) ABSTRACT

A combined personal convenience and remote fob device is provided for use with a transportation vehicle. The personal convenience device includes a housing and is adapted to perform a non-transportation related convenience function. The remote fob device is supported within the housing and is capable of performing at least one of an active remote keyless entry function, an active remote start function, a passive entry function, a passive start function, and an immobilizer function.

22 Claims, 4 Drawing Sheets

(56) References Cited

U.S. PATENT DOCUMENTS

| | | |
|---|---|---|
| 6,690,259 B2 | 2/2004 | Aslanidis et al. |
| 6,747,545 B2 | 6/2004 | Nowottnick et al. |
| 6,768,450 B1 | 7/2004 | Walters et al. |
| 6,819,229 B2 | 11/2004 | Ghabra et al. |
| 6,965,295 B2 | 11/2005 | Shimonomoto et al. |
| 6,992,568 B2 | 1/2006 | Perraud et al. |
| 7,034,683 B2 | 4/2006 | Ghazarian |
| 7,133,659 B2 | 11/2006 | Zalewski et al. |
| 7,170,400 B2 | 1/2007 | Cowelchuk et al. |
| 7,868,745 B2 | 1/2011 | Schmidt et al. |
| 2001/0037174 A1 | 11/2001 | Dickerson |
| 2001/0052839 A1* | 12/2001 | Nahata et al. ............... 340/5.72 |
| 2002/0140545 A1 | 10/2002 | Nietupski et al. |
| 2003/0043023 A1 | 3/2003 | Perraud et al. |
| 2003/0076097 A1 | 4/2003 | Lourens et al. |
| 2004/0145491 A1* | 7/2004 | Nascimento ............. 340/825.72 |
| 2005/0052286 A1 | 3/2005 | Perraud et al. |
| 2005/0122209 A1 | 6/2005 | Black |
| 2005/0192053 A1 | 9/2005 | Kao et al. |
| 2005/0197174 A1* | 9/2005 | Hasan et al. ............... 455/575.9 |
| 2005/0242923 A1* | 11/2005 | Pearson et al. ............... 340/5.62 |
| 2005/0248436 A1 | 11/2005 | Hohmann et al. |
| 2005/0285724 A1 | 12/2005 | Schmidt et al. |
| 2007/0155313 A1* | 7/2007 | Goldberg et al. ............ 455/3.06 |
| 2009/0243791 A1 | 10/2009 | Partin et al. |

FOREIGN PATENT DOCUMENTS

| | | |
|---|---|---|
| DE | 19952575 A1 | 5/2001 |
| DE | 10143017 A1 | 3/2003 |
| DE | 02003317 U1 | 9/2003 |
| EP | 1585268 A2 | 10/2005 |
| JP | 2009002742 | 1/2009 |
| WO | 0225040 A1 | 3/2002 |
| WO | 03079298 A2 | 9/2003 |

OTHER PUBLICATIONS

Combined Search and Examination Report under Sections 17 and 18(3) for Application No. GB 1116586 dated Jan. 17, 2012 and Jan. 18, 2012.

* cited by examiner

REMOTE FOB INTEGRATED IN A PERSONAL CONVENIENCE DEVICE

CROSS-REFERENCE TO RELATED APPLICATIONS

This application is a continuation-in-part patent application of U.S. patent application Ser. No. 10/876,698, filed Jun. 25, 2004, the disclosure of which is incorporated herein by reference.

BACKGROUND OF THE INVENTION

The present invention relates in general to a passive entry vehicle transmitter/receiver device, and more particularly, to a passive entry vehicle transmitter/receiver device integrated within a personal convenience device.

Remote keyless entry (RKE) systems are well known in the automotive industry for remotely accessing vehicles without the use of a key. RKE systems may be characterized as active or passive. In an active entry system, a user must activate a switch or pushbutton on a remote transmitter in order to have a desired remote function performed, such as locking or unlocking the vehicle doors or de-latching the trunk. In contrast, a passive entry system does not require a pushbutton by a user in order to have a desired remote function performed.

In active and passive entry systems, a remote device often referred to as a "FOB" or a "card" is carried with the user. The FOB is commonly carried on a key chain of the user. The FOB when prompted transmits a radio frequency (RF) signal to a module within the vehicle for performing a variety of remote vehicle functions such as door lock/unlock, enabling engine start, or activating external/internal lighting. Passive entry systems include a transmitter and receiver (or transceiver) in an electronic control module disposed within the vehicle. The transceiver is in communication with one or more devices (e.g., door lock mechanism) for determining when a request for actuation of a device is initiated (e.g., lifting a door handle) by a user.

Upon sensing the actuation, the transceiver broadcasts a passive entry interrogating signal. The fob upon receiving the interrogating signal determines if the interrogating signal is valid. If it is determined a valid signal, then the fob automatically broadcasts an output signal which includes an encrypted or rolling identification code to the electronic control module. The electronic module thereafter determines the validity of the output signal and generates a signal to the device to perform an operation (e.g., the door lock mechanism to unlock the door) if the output signal is determined valid.

In performing the passive entry function, the device must be carried on the user and within a broadcasting region of the interrogation signal to allow operation of the automated feature (i.e., door unlock). It is desirable to have a device that is easily portable and commonly carried with the person at all times. As stated earlier, the fob is commonly attached to a key chain. The key chain typically includes a plurality of keys for accessing a variety of items such as the user's house, office, desks, relative's house, safety devices and the like, and the addition of the fob makes for an additional bulky item on an already overloaded key chain. In addition, the ever increasing store discount membership cards which are attachable to the key chain add to the overloaded and bulky key chain.

Furthermore, if a user owns more than one vehicle, then multiple fobs are utilized for accessing each vehicle. If the user desires to have all vehicle keys on one key chain, then each fob is added on the single key chain which creates an over-capacitized, bulky, and awkward item to carry especially in a user's pocket. Alternatively, if multiple users utilize a single vehicle, it is convenient for each user to have a set of keys to the vehicle. However, if multiple key rings are used for a single vehicle, then multiple fobs must be provided on each key chain, or a respective user would have to remember to retrieve the single fob whenever the vehicle needs to be accessed.

SUMMARY OF THE INVENTION

The present invention provides a portable device that is ordinarily carried with a user of a vehicle a majority of the time for accessing a vehicle passively. The portable device integrates a passive entry device so that remote entry may be gained to the vehicle without having to manually activate a remote keyless entry device or use a key to gain access to the locked vehicle.

In one aspect of the present invention, a portable personal convenience device carried by a person having access to a transportation vehicle is provided that includes personal convenience means for performing a non-transportation related convenience function. A passive entry device is integrated within the personal convenience means and adapted to interact with the transportation vehicle for passively gaining access thereto. The passive entry device includes a receiver for receiving an interrogating signal from an electronic control module in the transportation vehicle. A transmitter is provided for broadcasting a response signal to the electronic control module. A controller is provided for controlling the transfer of the response signal to the electronic control module in response to the interrogating signal.

In another aspect of the present invention, a combined personal convenience and remote fob device is provided for use with a transportation vehicle. The personal convenience device includes a housing and is adapted to perform a non-transportation related convenience function. The remote fob device is supported within the housing and is capable of performing at least one of an active remote keyless entry function, an active remote start function, a passive entry function, a passive start function, and an immobilizer function.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
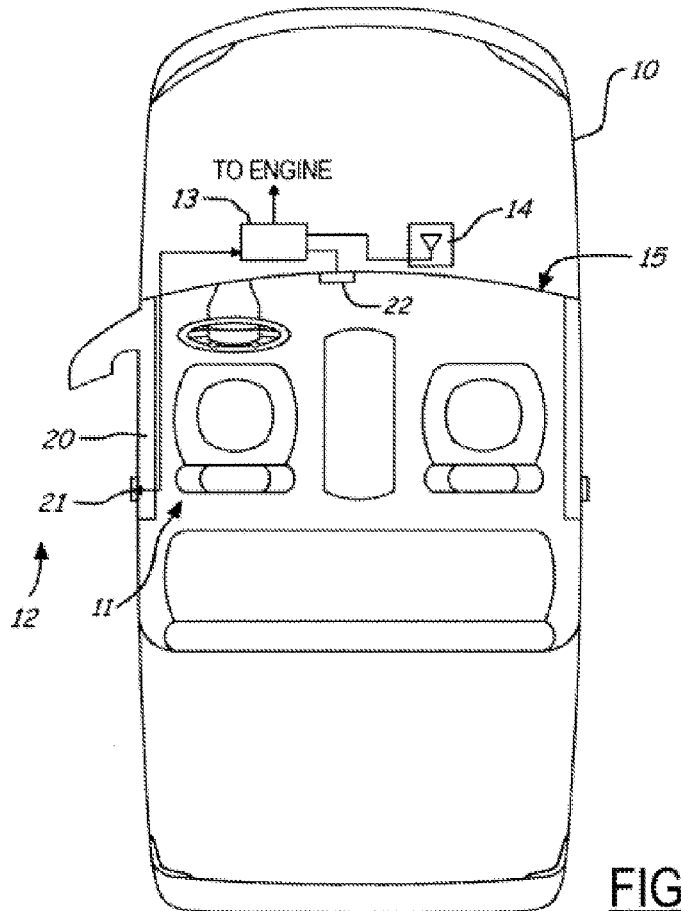
FIG. 1 is a perspective view of a vehicle incorporating a passive entry system.

Referring now to the Drawings and particularly to FIG. 1, there is shown a transportation vehicle 10 utilizing a passive entry system. The transportation vehicle 10 includes an interior portion 11. A vehicle door 20 allows access between the interior portion 11 and an exterior region 12 located outside of the transportation vehicle 10. A door handle 21 is mounted on the exterior of the transportation vehicle 10. The door handle 21 includes an activation switch 23 (FIG. 2) and a lock actuation mechanism 24 (FIG. 2) for unlocking/locking the vehicle door 20. An electronic control module 13 is disposed within the vehicle for providing control signals for unlocking/locking the vehicle door 20. In the preferred embodiment, the electronic control module 13 is located within the vehicle instrument panel 15, however, in other preferred embodiments, the electronic control module 13 may be located elsewhere within the transportation vehicle 10. The electronic control module 13 is coupled to at least one antenna 14 for receiving and transmitting signals therefrom. The antenna may be located internal to the transportation vehicle 10 (e.g., instrument panel) or about the exterior (e.g. side view mirror).

The activation switch 23 is coupled to the door handle 21. By lifting the door handle 21, a user generates a door unlock request. The electronic control module 13 responds to the request by broadcasting an interrogating signal to a broadcast region located in the exterior region 12.

Figure 2:
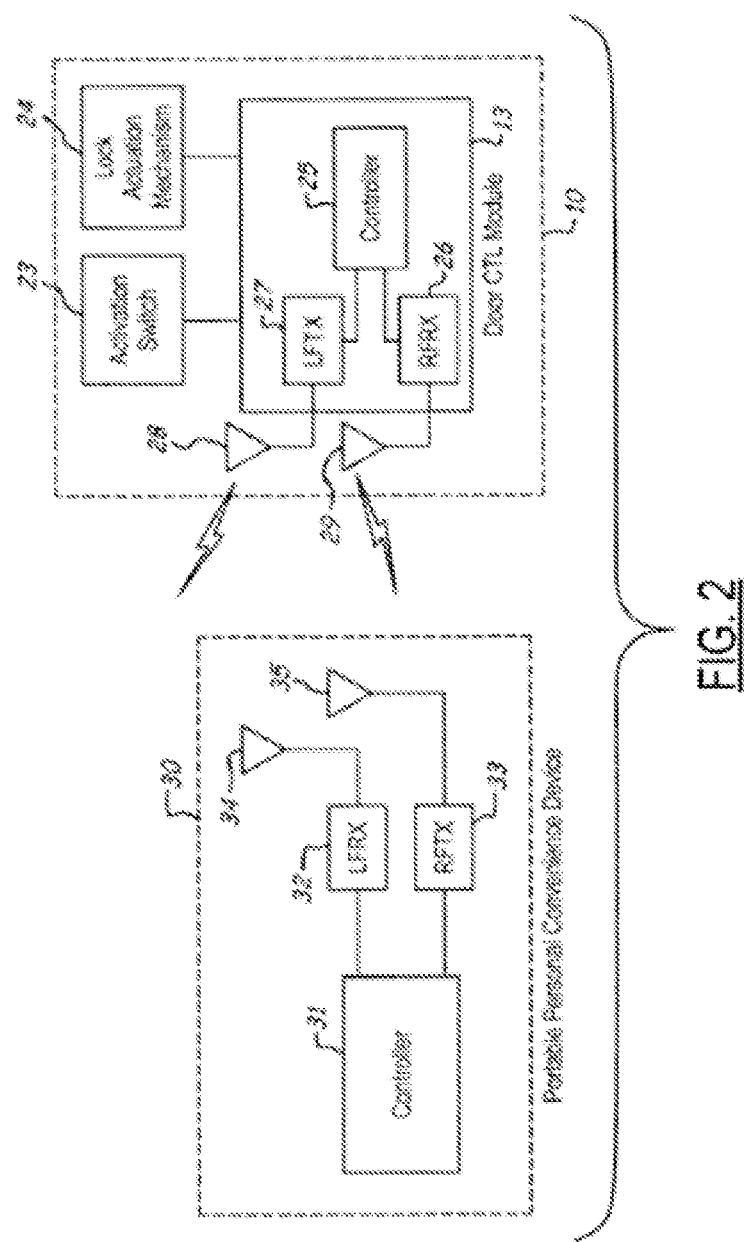
FIG. 2 is a block diagram showing a portable personal convenience device and a vehicle passive entry electronic control module of the present invention.

The passive entry system is shown in greater detail in FIG. 2. The electronic control module 13 disposed within the vehicle 10 includes a controller 25 for controlling the transmission and processing of the input/output signals to and from the electronic control module 13. The controller 25 may include memory containing software code that is executable by the controller 25. Other memory devices (not shown) such as an erasable programmable read-only memory (EPROM) may be included for storing other data if additional memory or unique programming is required.

The electronic control module 13 includes a low frequency transmitter (LFTX) 27 connected to a low frequency transmitting antenna 28 for transmitting low frequency signals to a user-carried device. The electronic control module 13 further includes a high frequency receiver (RFRX) 26 connected to a high frequency receiving antenna 29 for receiving high frequency signals. The electronic control module 13 is connected to the activation switch 23 for determining when a user is accessing the vehicle 10 via the door handle 21. When the user lifts the door handle 21, the activation switch 23 senses the presence of the user attempting to access the transportation vehicle 10. The electronic control module 13, in response to the signal received from the activation switch 23, transmits a low frequency passive entry interrogating signal via the LFTX 27 and low frequency transmitting antenna 28 to a portable personal convenience device 30 that is carried by a user.

The portable personal convenience device 30 includes a low frequency receiver (LFRX) 32 and a low frequency receiving antenna 34 for receiving the low frequency passive entry interrogating signal from the LFTX 27. Upon receiving the interrogating signal, a controller 31 of the portable personal communication device 30 determines if the interrogating signal is valid such that the interrogating signal matches a code stored in the controller 31. If the interrogating signal is valid, then the portable personal convenience device 30 broadcasts a response signal via a high frequency transmitter (RFTX) 33 and the high frequency transmitting antenna 35 to the electronic control module 13. The response signal includes an encrypted or rolling identification code to deter theft or electronic eavesdropping of the response signal. The electronic control module 13 receives the response signal via the high frequency receiving antenna 29 and the RFRX 26. In alternative embodiments, a transceiver may be used in place of a device having a respective transmitter and a respective receiver.

The controller 25 of the electronic control module 13 processes the response signal to determine if the response signal matches the identification code stored in the memory of the controller 25. If so, then the electronic control module 13 outputs a control signal to a vehicle door security mechanism such as the door lock actuation mechanism 24 for unlocking the vehicle door 21. As a result, the vehicle door 21 is automatically unlocked without the user having to actuate a remote keyless entry switch on a remote device or insert a key to open the vehicle door 21.

Figure 3:
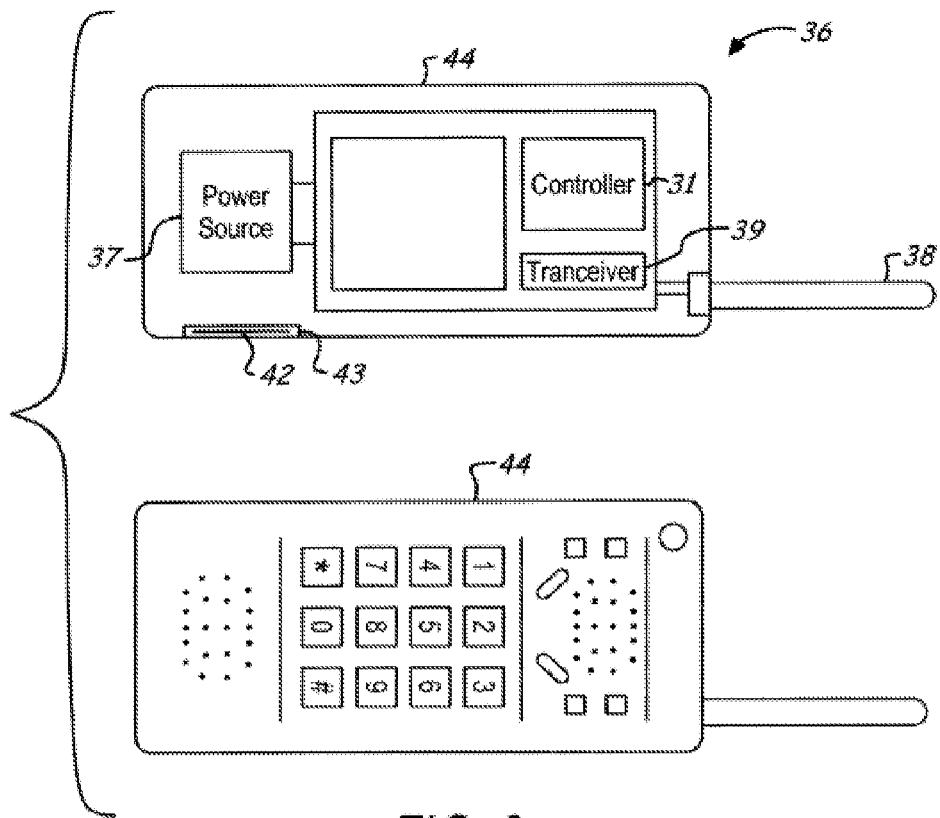
FIG. 3 is a portable personal convenience device according to a first preferred embodiment of the present invention.

A preferred embodiment of the portable personal convenience device is shown in FIG. 3. Such a device is one that is commonly carried with the user. This alleviates the need for adding a device to a key chain or carrying the additional device on the user. In the preferred embodiment, the portable personal convenience device 30 comprises a personal convenience means such as a cellular telephone 36. The cellular telephone 36 integrates the passive entry electronics for cooperatively actuating the door locking mechanism. A housing 44 (e.g., telephone casing) conceals the passive entry device along with the electronic components for the cellular telephone 36. The cellular telephone 36 is a personal device which is commonly carried on the user. In addition, since the cellular telephone 36 is a wireless communication device, one or more of the electronic components within the cellular telephone 36 may be cooperatively used to perform the wireless signal broadcast required for a remote passive entry device as opposed to utilizing duplicate electrical components for a variety of independent functions.

The electronic components in the cellular telephone 36 that are cooperatively utilized with the passive entry system include a controller 31, a transceiver 39, an antenna 38, and a power supply 37. The controller 31 of the cellular telephone 36 typically controls the cellular telephone's transceiver 39 for broadcasting a wireless communication signal. The controller 31 may further be used to control the reception of an interrogating signal and the transmission of the response signal to the electronic control module 13. The antenna 38 is utilized for converting the incoming electromagnetic fields into an AC current of the same frequency and for converting an AC current at a specific frequency into an outgoing electromagnetic field at the same frequency for both the cellular and passive entry communication signals. The transceiver 39 (or individual transmitter and receiver) transmits and receives the wireless cellular signals as well as the interrogating and response signals of the passive entry system.

In the preferred embodiment, a power source 37 of the cellular telephone 36 may be used to power all devices within the portable personal convenience device 30. This includes the controller 31, the transceiver 39 and other drivers required for operation, and other cellular electronics for operating the cellular telephone 36. In alternative embodiments, separate controllers, power supplies, or transceivers may be used to independently operate the wireless cellular phone and the passive entry electronic components.

In yet another preferred embodiment, the portable personal convenience device 30 (e.g., cellular telephone) may include an expansion slot 43 for receiving a plug-in module 42. The plug-in module 42 when inserted in the expansion slot 43 receives electrical power from the personal convenience means. The electrical power may be provided from a direct electric connection to the power supply of the personal convenience means. In an alternative embodiment, the electrical power may be provided by a passive induced electrical field.

The plug-in module 42 includes an algorithm for performing a vehicle specific passive entry function. Vehicle specific passive entry functions include a vehicle unlock function, an engine start function, and an immobilization function. The plug-in module 42 may be used among various portable personal convenience devices. With the use of the plug-in module 42, the specific programming software particular to a vehicle does not need to be fixed to the portable personal convenience devices, rather the plug-in module 42 may be interchangeable between portable devices. For example, a cellular phone can be manufactured without the user specific software and data that is specific to a specific user vehicle. If the user purchases a new phone, the user may transfer the software and other related data via the plug-in module 42 to a next cellular phone. Furthermore, the plug-in module 42 may include a plurality of identification codes and messaging protocols for accessing more than one transportation vehicle.

Figure 4:
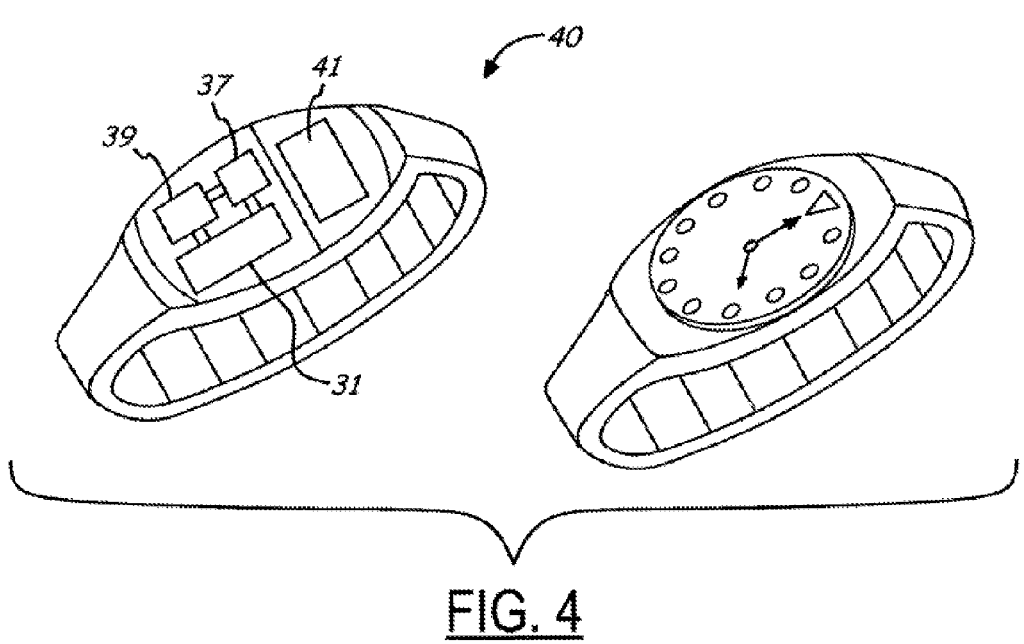
FIG. 4 is a portable personal convenience device according to a second preferred embodiment of the present invention.

FIG. 4 illustrates a non-electronic device integrating the passive entry components for passive entry control. A wrist watch, shown generally at 40, includes non-electrical components for operating the time function of the watch. The timing module, shown generally at 41, includes components such as a spring, oscillating mass, and gears to drive timing hands on a numerated dial. The electrical components for passive entry control include the power source 37, the controller 31 and the transceiver 39. In alternative embodiments, a digital clock may be utilized as opposed to a wind-up watch. A battery is used as a power source for providing power to the electrical components associated with the digital timing controls and display. The battery may be utilized to power both the digital clock and the passive entry electrical components. In other preferred embodiments, the personal convenience means may include personal communication devices such as pagers or other electronic devices such as a PDA, a memory stick, and a fuel pass device.

Figure 6:
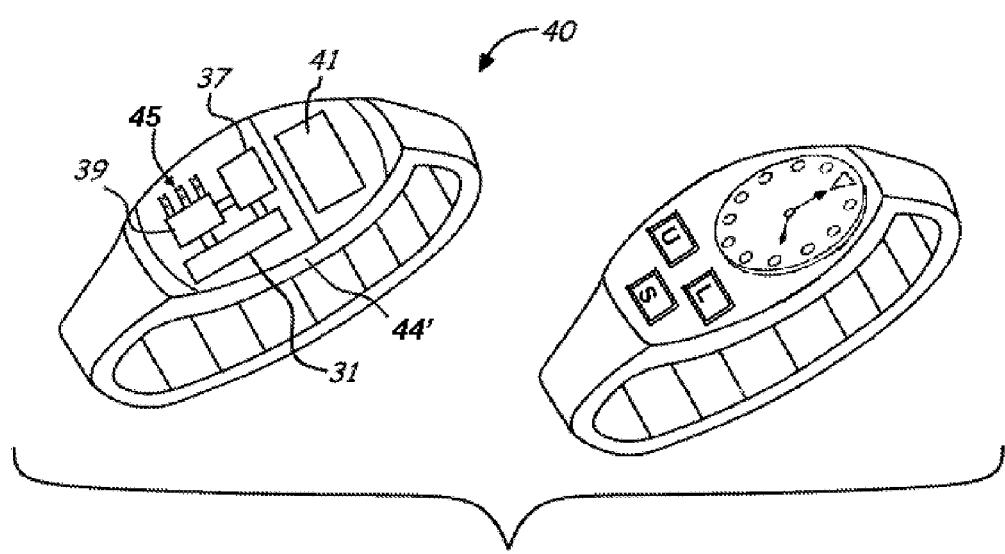
FIG. 6 is another embodiment of the portable personal convenience device as shown in FIG. 4.

As shown in FIG. 6, the illustrated wrist watch 40 may also include a multiple axis antenna, shown generally at 45, for improving the ability of the personal convenience device to receive and transmit signals independent of orientation or position of the wrist watch 40. For example, the multiple axis antenna 45 is illustrated as a multiple inductive coil antenna for optimization of the transmission and/or reception of signals in more than one plane, such as disclosed in U.S. Pat. No. 6,563,474 to Nantz et al., which is incorporated herein by reference. The multiple axis antenna 45 may be connected to the transceiver 39 or to a LFRX for receiving a LF magnetic field. It should be appreciated that the multiple axis antenna 45 can be any device capable of receiving and transmitting signals independent of orientation or position of the wrist watch 40.

In the illustrated embodiment, a housing 44' encircles the components of the passive entry system along with the components of the wrist watch 40. As such, the housing 44' can be formed from any non-conductive material that permits the passage of signals through the housing 44'. In alternative embodiments, the housing 44' may be formed from a conductive material, such as a metal, having a non-conductive or non-continuous portion that permits the passage of signals. For example, the housing 44' may define a metallic ring-like structure having a notch or break provided therein. This embodiment provides sufficient strength for the wrist watch 40 and enables signals to be received and transmitted by the multiple axis antenna 45.

As described above, the power source 37 may also include a battery (not shown) to power both the digital clock and the components of the passive entry system. In one embodiment, the battery may be a rechargeable battery. The power source 37 may also include a charging device (not shown) for charging the battery. For example, the charging device may be a miniature electric generator that is configured to derive energy from kinetic movement of the wrist watch 40. However, it should be appreciated that the charging device may be any device adapted to recharge the battery.

To reduce energy consumption from the power source 37, the transceiver 39 or the LFRX may perform a sequential interrogation or polling operation. During the polling operation, the transceiver 39 is adapted to periodically search for a signal from the LFTX 27 of the electronic control module 13. As such, the controller 31 or other device may periodically alert the transceiver 39 to search for a signal. This prevents the transceiver 39 or LFRX from continually searching for a signal, which can unnecessarily consume energy from the power source 37. It should be appreciated that the polling operation can be incorporated into a system that automatically returns a signal when prompted by the electronic control module 13, such as a passive immobilizer system, or in a system that validates an interrogation signal prior to transmitting a response signal, such as a passive entry system.

The illustrated wrist watch 40 may also include an active remote keyless entry (RKE) system. The active RKE system enables the user to actively lock or unlock the vehicle door 21 from a remote location using the wrist watch 40. As shown in FIG. 6, the wrist watch 40 includes an unlock button U and a lock button L for use with the active RKE system. The active RKE system utilizes the transceiver 39 and the multiple axis antenna 45 or a high frequency transmitting antenna to transmit a command signal to the RFRX 26 of the electronic control module 13 when one of the unlock U or lock L buttons is depressed by the user. In response to the command signal, the electronic control module 13 outputs a control signal to the door lock actuation mechanism 24 for unlocking or locking the vehicle door 21.

The wrist watch 40 may also include an active remote start system. The active remote start system enables the user to actively start or turn off the vehicle engine from a remote location using the wrist watch 40. As shown in FIG. 4, the wrist watch 40 includes a start button S for use with the active remote start system. Similar to the active RKE system described above, the active remote start system utilizes the transceiver 39 and the multiple axis antenna 45 or a high frequency transmitting antenna to transmit a command signal to the RFRX 26 of the electronic control module 13 whenever the start button S is depressed by the user. In response to the command signal, the electronic control module 13 outputs a control signal to the ignition switch (not shown) for starting or turning off the vehicle engine.

In addition to the passive entry system described above, the wrist watch 40 may also include a passive start system, collectively referred to as a passive entry-passive start (PEPS) system. Thus, the PEPS system is further capable of passively starting or turning off the vehicle engine upon actuation of the PEPS system. And although each system may be operated independently of the other, it should be appreciated that the combined PEPS system can utilize the same electronic components and operate in substantially the same manner as the passive entry system described above. Instead, however, the electronic control module 13 outputs a control signal to the ignition switch (not shown) for starting or turning off the vehicle engine.

The wrist watch 40 may also include an immobilizer system to deter theft of the vehicle. The immobilizer system prevents the vehicle engine from starting unless a valid signal is received by the electronic control module 13 of the vehicle. When a request for ignition of the vehicle engine is initiated by the user, the LFTX 27 of the electronic control module 13 produces a LF magnetic field. This LF magnetic field induces the transceiver 39 or a RFTX of the wrist watch 40 to transmit a response signal to the RFRX 26 of the electronic control module 13. As such, the immobilizer system of the wrist watch 40 may be a passive system that does not require energy from the power source 37 of the wrist watch 40. During operation of the system, if the electronic control module 13 determines that the response signal is valid, then the ignition process may proceed to start the vehicle engine. On the other hand, if the electronic control module 13 does not receive a response signal or if the response signal is invalid, then the immobilizer system may operate to cut off the fuel supply to the vehicle engine, deactivate the vehicle throttle, or activate the vehicle brakes.

It should be fully appreciated that the illustrated wrist watch 40 may incorporate the active RKE system, the active remote start system, the PEPS system, and the immobilizer system, or any combination thereof. As such, one or more of the electronic components of the wrist watch 40 may be cooperatively used to perform the above capabilities as opposed to utilizing duplicate electrical components for a variety of independent functions. In addition, the wrist watch 40 may be any personal convenience device that is intended to worn by the user, further including but not limited to pocket watches, pendants, sunglasses, belt buckles, shoes, and the like.

Figure 5:
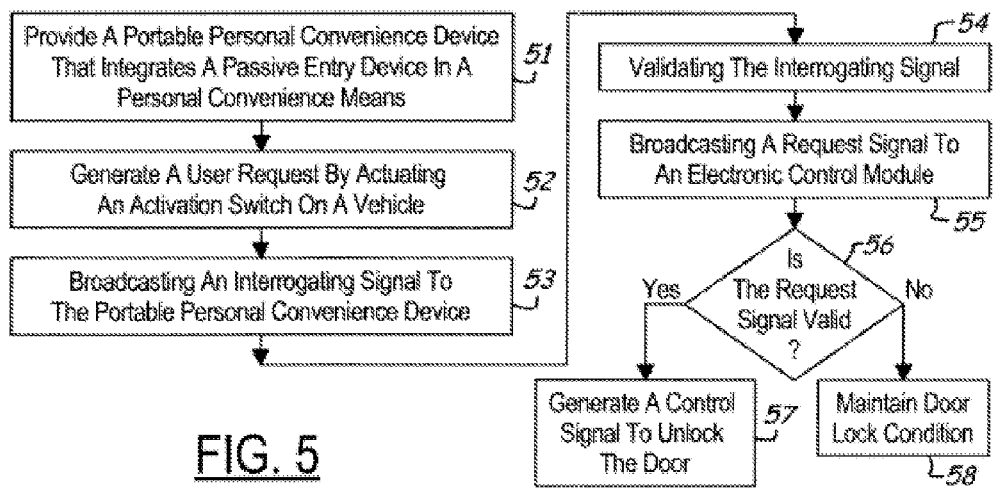
FIG. 5 is a flowchart of a preferred embodiment for a passive entry system of the present invention.

A preferred method for operating a passive entry system using a portable personal convenience device is shown in FIG. 5. A portable personal convenience device is provided that integrates a personal convenience means that performs a non-transportation related function such as a cellular telephone with a remote passive entry device in step 51. In step 52, a user generates a user request by actuating an activation switch on the vehicle such as a door handle. In step 53, an interrogating signal is automatically provided to a receiver within the portable personal convenience device in response to the actuation of the activation switch. In step 54, the interrogating signal is validated by the controller within the portable personal convenience device. In step 54, the controller of the portable personal convenience device controls the broadcast of a response signal to an electronic control module via a transmitter.

In step 55, the electronic control module matches the response signal with the identification code stored in memory. In step 56, a determination is made whether the response signal is valid. In step 57, if a determination is made that the response signal is valid, then the electronic control module generates a control signal to the door lock activation mechanism for unlocking the vehicle door (or other passive function such as passive engine starting or trunk unlatch). In step 58, if a determination is made that the response signal is not valid, then the door lock mechanism lock activation mechanism remains locked.

From the foregoing description, one ordinarily skilled in the art can easily ascertain the essential characteristics of this invention and, without departing from the spirit and scope thereof, can make various changes and modifications to the invention to adapt it to various usages and conditions.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A combined personal convenience and remote fob device adapted for use with a transportation vehicle, said combined personal convenience and remote fob device comprising:
   a personal convenience device having a housing, wherein the personal convenience device is one of:
   a cellular telephone;
   a wrist watch;
   a pocket watch;
   a pendant;
   sunglasses;
   a belt buckle; and
   a shoe; and
   a remote fob device supported within the housing of the personal convenience device, the remote fob device being capable of performing at least one of:
   an active remote keyless entry function;
   an active remote start function;
   a passive entry function;
   a passive start function; and
   an immobilizer function;
   wherein the combined personal convenience and remote fob device is adapted for use with a transportation vehicle having an electronic control module, and wherein the remote fob device is adapted to generate signals directly to an electronic control module provided in the transportation vehicle.

2. The combined personal convenience and remote fob device of claim 1, wherein the remote fob device is capable of performing an active remote keyless entry function.

3. The combined personal convenience and remote fob device of claim 1, wherein the remote fob device is capable of performing an active remote start function.

4. The combined personal convenience and remote fob device of claim 1, wherein the remote fob device is capable of performing a passive start function.

5. The combined personal convenience and remote fob device of claim 1, wherein the remote fob device is capable of performing an active remote keyless entry function and a passive start function.

6. The combined personal convenience and remote fob device of claim 1, wherein the remote fob device is capable of performing an active remote keyless entry function and an immobilizer function.

7. The combined personal convenience and remote fob device of claim 1, wherein the remote fob device is capable of performing an active remote keyless entry function, an active remote start function, a passive entry function, a passive start function, and an immobilizer function.

8. The combined personal convenience and remote fob device of claim 1, wherein the personal convenience device is an object intended to worn by a user.

9. The combined personal convenience and remote fob device of claim 8, further including a receiver and multiple axis antenna adapted to receive signals.

10. The combined personal convenience and remote fob device of claim 8, wherein the housing is formed from a conductive material that includes a non-conductive portion.

11. The combined personal convenience and remote fob device of claim 8, further including a power source having a rechargeable battery and a charging device that derives energy from movement of the personal convenience device for recharging the battery.

12. The combined personal convenience and remote fob device of claim 8, further including a receiver that is adapted to perform a polling operation.

13. The combined personal convenience and remote fob device of claim 8, further including:
- a receiver adapted to receive an input signal from a transportation vehicle;
- a transmitter adapted to broadcast a response signal to the transportation vehicle; and
- a controller that receives the input signal from the receiver and causes the transmitter to broadcast the response signal.

14. The combined personal convenience and remote fob device of claim 13, wherein the input signal is an interrogation signal, and the controller determines whether the interrogation signal is valid and causes the transmitter to broadcast the response signal when the interrogation signal is valid.

15. The combined personal convenience and remote fob device of claim 1, wherein the personal convenience device is a cellular telephone.

16. The combined personal convenience and remote fob device of claim 1, wherein the personal convenience device is a wrist watch.

17. The combined personal convenience and remote fob device of claim 1, wherein the personal convenience device is a pocket watch.

18. The combined personal convenience and remote fob device of claim 1, wherein the personal convenience device is a pendant.

19. The combined personal convenience and remote fob device of claim 1, wherein the personal convenience device is sunglasses.

20. The combined personal convenience and remote fob device of claim 1, wherein the personal convenience device is a belt buckle.

21. The combined personal convenience and remote fob device of claim 1, wherein the personal convenience device is a shoe.

22. A combined personal convenience and remote fob device comprising:
- a personal convenience device that is selected from the list of: a cellular telephone; a wrist watch; a pocket watch; a pendant; sunglasses; a belt buckle; and a shoe and, the personal convenience device including a housing; and
- a remote fob device supported within the housing of the personal convenience device and performs at least one of the following functions in association with a transportation vehicle: an active remote keyless entry function; an active remote start function; a passive entry function; a passive start function; and an immobilizer function;
- wherein the remote fob device is adapted to generate signals directly to an electronic control module provided in a transportation vehicle so as to perform at least one of the functions in association with the transportation vehicle.

\* \* \* \* \*